2 Sheets--Sheet 1.

M. McKAIG & W. J. MUNCASTER.
Portable Steam-Engines.

No. 166,541.  Patented Aug. 10, 1875.

Witnesses:

Inventor:
Merwin McKaig
W. J. Muncaster
By their attys
Dodge & Son

2 Sheets--Sheet 2.

M. McKAIG & W. J. MUNCASTER.
Portable Steam-Engines.

No. 166,541. Patented Aug. 10, 1875.

Witnesses:
Hill H. Dodge
Donn Twitchell.

Inventor:
Mervin McKaig
W. J. Muncaster
By their attys
Dodge & Son

UNITED STATES PATENT OFFICE.

MERWIN McKAIG AND WALTER J. MUNCASTER, OF CUMBERLAND, MD.

IMPROVEMENT IN PORTABLE STEAM-ENGINES.

Specification forming part of Letters Patent No. 166,541, dated August 10, 1875; application filed May 26, 1875.

*To all whom it may concern:*

Be it known that we, MERWIN McKAIG and WALTER J. MUNCASTER, of Cumberland, in the county of Alleghany and State of Maryland, have invented certain Improvements in Portable Steam-Engines, of which the following is a specification:

This invention relates to steam-engines; and the invention consists of a peculiarly-constructed frame, so arranged as to support one end of the boiler, and at the same time sustain at its upper end an inverted vertical cylinder, and forming guides for the cross-head and bearings below for the crank-shaft with its balance-wheel. It further consists in a novel arrangement of the feed-pump and feed-water heater in connection with the other parts, all as hereinafter more fully described.

Figure 1:
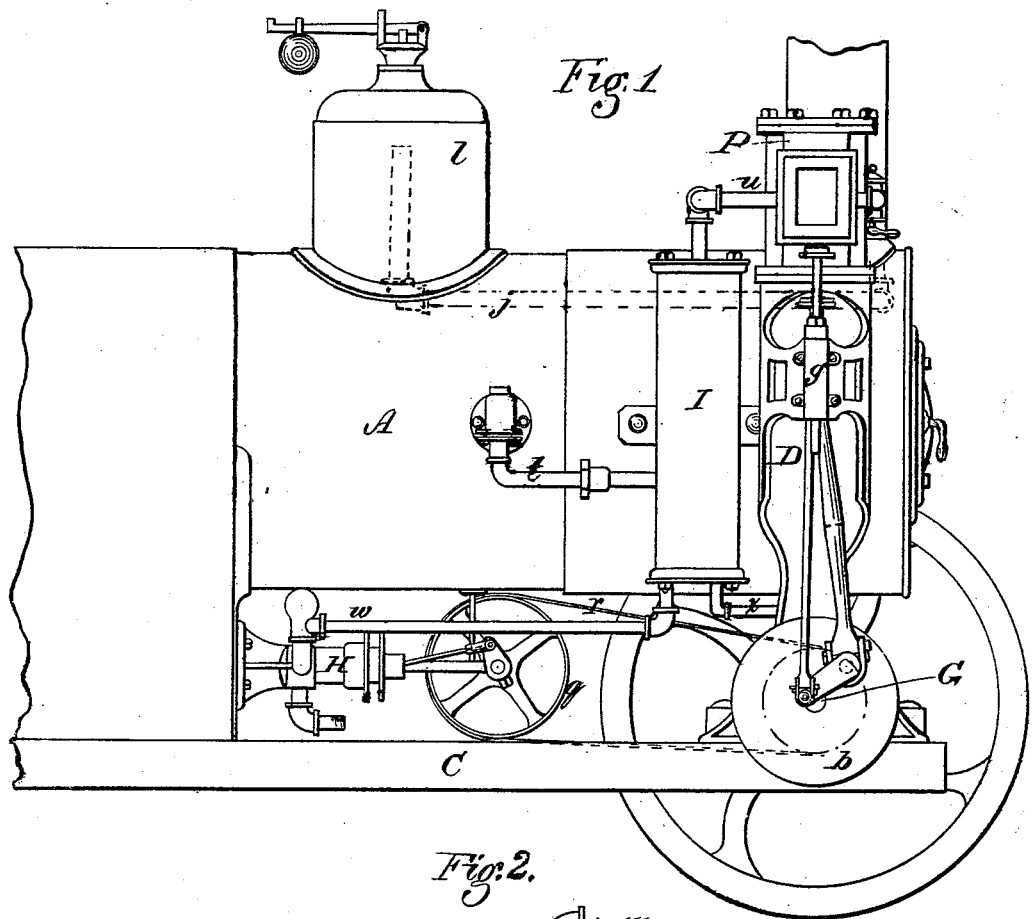
Figure 2:
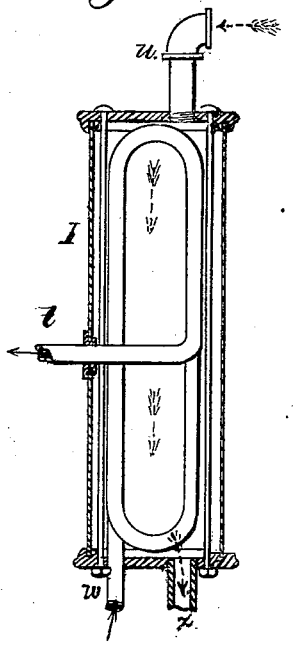
Figure 3:
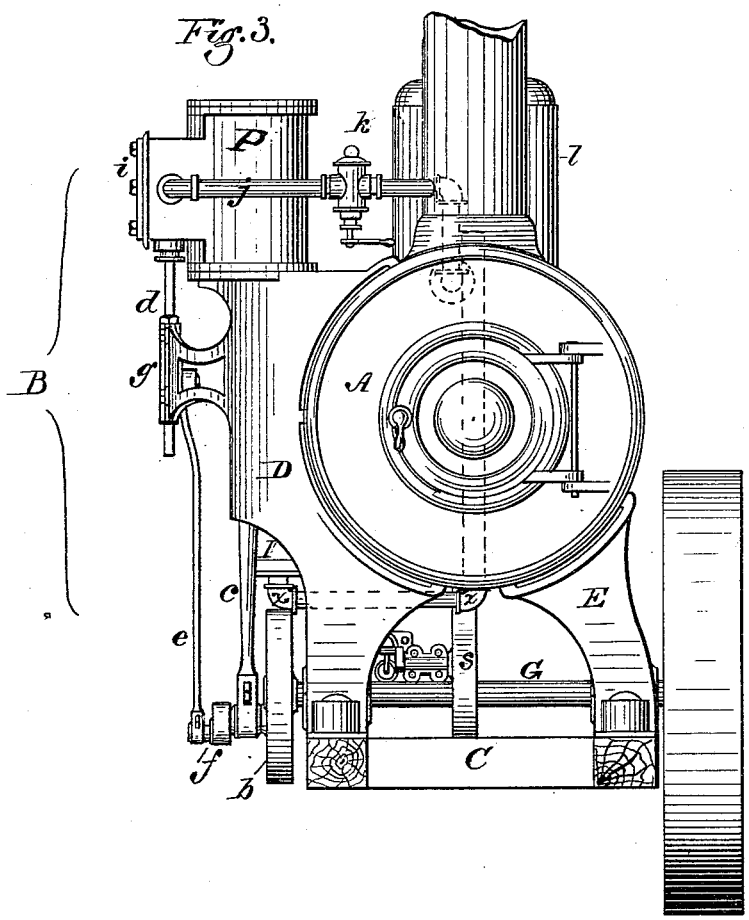
Figure 4:
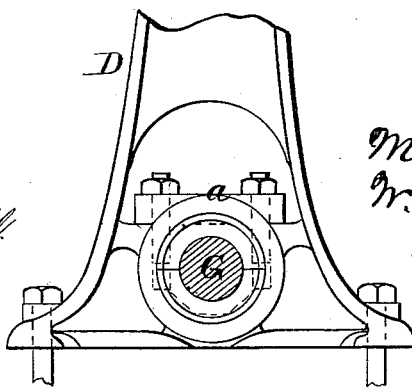

Figure 1 is a side elevation, and Fig. 3 an end elevation, of an engine constructed on our plan. Figs. 2 and 4 represent portions shown in detail.

The object of our invention is to produce a portable engine for general use which shall be compact, simple, and strong, and in which the driving-shaft, with its balance-wheel, shall be at the bottom instead of the top, so as to render the engine less top-heavy, and render it more firm, or less shaky, when in operation. Another object is to so construct the frame that all the bearings of the working parts shall be in or on one solid casting, by which to secure greater rigidity and keep the working parts in their proper relative position; and, further, to so locate the pump and feed-water heater in relation to the other parts as to render them highly efficient, and at the same time protect them more effectually from accidental injury.

As shown in Figs. 1 and 3, the engine-frame D is cast in one solid piece, with its lower end widened and flattened to rest upon the bed-frame C, its upper end adapted to receive the engine-cylinder P, and its back hollowed out in a concave form to fit upon the cylindrical body of the boiler. The end of the boiler is sustained by the engine-frame on one side, and a saddle, E, under the other side, the frame and saddle being both bolted rigidly to the base-frame C and riveted or bolted to the boiler. The main or crank shaft G extends transversely under the boiler, and is supported at one end by a bearing in the foot of the engine-frame, as shown in Fig. 4, and at the other end by a bearing in the saddle E. The piston-rod is connected by a pitman, as usual, with a crank-wheel on the end of the main shaft. The cross-head guides are formed solidly on the inner sides of the engine-frame D, which is also provided with a guide, $g$, for the valve-stem. The steam-chest is located on the outside of the cylinder H, and the valve-stem operated by a pitman, $e$, connecting with a small or secondary crank, $f$, secured to the main crank or wrist, as shown in Figs. 1 and 3. The steam-supply pipe $j$ extends from the steam-dome forward through the steam-space into the smoke-box, and thence through the side of the chimney to the cylinder, so that it is inclosed nearly its entire length, and radiation prevented. From the cylinder the exhaust steam is conducted by a pipe, $u$, into a feed-water heater, I, from which it is conducted by a pipe, $x$, up through the smoke-box of the boiler, and discharged up the stack or chimney, as shown in Fig. 3, for the purpose of creating a draft. The feed-water heater consists simply of a hollow shell or cylinder to receive the steam, and of a water-pipe coiled around therein, as shown in Fig. 2, so that the water in passing through the pipe is heated by the steam surrounding the same. The shell or cylinder of the heater is composed of a sheet-metal body, and of two heads or plates, which are grooved to receive the ends of the body, and secured thereon by rods, which are passed lengthwise through the body and out through the plates, and provided with nuts on their ends, as shown in Fig. 2. The feed-pump H is located below the boiler, and arranged to deliver the cold water to the heater I, whence it passes in a heated state into the boiler. By thus locating the heater between the pump and the boiler we are enabled to deliver hot water into the boiler without the expense and annoyance incident to the use of a hot-water pump.

It is obvious that this result may be attained by the use of a pump and heater of any suitable construction, provided the heater is located between the pump and the boiler. The pump is sustained in position by means of a flange or base-plate riveted or bolted to the front of the fire-box and an arm attached to the under side of the boiler-body, as represented in Fig. 1. The pump is provided with a crank-shaft and pitman to operate its plunger, and with a driving-pulley, $q$, on said shaft. The pulley $q$ is driven by a belt, $r$, from a pulley, $s$, on the middle of the main shaft of the engine, as shown in Figs. 1 and 3.

It will thus be seen that the pump is located under the boiler entirely out of the way, and where it can be conveniently operated from the main shaft G by a belt, which is simpler and cheaper than gearing. In like manner the feed-water heater is located in the angle formed by the laterally-projecting frame D, in close proximity to the steam-cylinder, by which the steam has but a very short distance to travel in passing from the cylinder to it, thereby preventing a loss of heat by radiation. This location or arrangement of the feed-pump and the heater is important, as they are thus protected from injury by accidental blows from falling or moving objects, which is especially likely to occur where these engines are used for cutting lumber in the forest, they usually being set up without any building or permanent protection.

In order to prevent the engine-frame and the saddle E from being overheated by the boiler they are cut away in such manner as to leave large air-spaces between them and the boiler, as clearly represented in Fig. 3.

When preferred the engine-frame and the saddle E may be made in one piece or bolted firmly together. The engine-frame, instead of being cast in one piece, may be made of two or more parts, secured firmly and rigidly together.

Having described our invention, what we claim is—

1. The combination, in a portable steam-engine, of the horizontal boiler A and frame D, constructed substantially as described, whereby the said frame supports the cylinder above, and the crank-shaft with its balance-wheel below, the boiler, as set forth.

2. In combination with the horizontal boiler A, the engine-frame D, having its back fitted to the boiler, and its upper end adapted to receive the engine-cylinder, substantially as shown and described.

3. The engine-frame D, having its back adapted to fit upon and support the end of the horizontal boiler, and its lower end provided with bearings for the main shaft, in combination with the vertical cylinder P, substantially as set forth.

4. The frame D, having its back made concave to fit upon and support the boiler, with bearings for the cross-head in its interior, the bearings or guides $g$ for the valve-stem, and the boxes or bearings at its lower end for the main shaft, substantially as shown and described.

5. The pump H, secured to the boiler underneath the same, in combination with its operating-wheel $q$ and main shaft G, all being arranged to operate as set forth.

MERWIN McKAIG.
W. J. MUNCASTER.

Witnesses:
W. C. DODGE,
P. T. DODGE.